US012142290B2

(12) United States Patent
Zheng et al.

(10) Patent No.: US 12,142,290 B2
(45) Date of Patent: Nov. 12, 2024

(54) AUDIO SIGNAL GENERATION METHOD AND SYSTEM

(71) Applicant: Shenzhen Shokz Co., Ltd., Shenzhen (CN)

(72) Inventors: Jinbo Zheng, Shenzhen (CN); Meilin Zhou, Shenzhen (CN); Fengyun Liao, Shenzhen (CN); Xin Qi, Shenzhen (CN)

(73) Assignee: Shenzhen Shokz Co., Ltd., Shenzhen (CN)

( * ) Notice: Subject to any disclaimer, the term of this patent is extended or adjusted under 35 U.S.C. 154(b) by 247 days.

(21) Appl. No.: 17/681,706

(22) Filed: Feb. 25, 2022

(65) Prior Publication Data

US 2022/0208209 A1 Jun. 30, 2022

Related U.S. Application Data

(63) Continuation of application No. PCT/CN2020/142004, filed on Dec. 31, 2020.

(51) Int. Cl.
*G10L 21/0232* (2013.01)
*G10L 21/038* (2013.01)
(Continued)

(52) U.S. Cl.
CPC ........ *G10L 21/0232* (2013.01); *G10L 21/038* (2013.01); *G10L 25/60* (2013.01);
(Continued)

(58) Field of Classification Search
CPC ... G10L 21/0232; G10L 21/038; G10L 25/60; G10L 2021/02165; G10L 21/0216;
(Continued)

(56) References Cited

U.S. PATENT DOCUMENTS 10,535,362 B2 * 1/2020 Bryan ................. G10L 21/0364
10,986,235 B2 * 4/2021 Seo ....................... H04M 9/082
(Continued)

FOREIGN PATENT DOCUMENTS

CN 111131947 A 5/2020
CN 111161751 A 5/2020
(Continued)

OTHER PUBLICATIONS

International Search Report of PCT/CN2020/142004 (Aug. 26, 2021).

*Primary Examiner* — Abul K Azad

(57) ABSTRACT

An audio generation method and system provided in this disclosure can dynamically select a frequency splicing point of an audio signal based on voice quality of a first audio signal and a second audio signal corresponding to each frequency in a frequency domain, divide the frequency domain into a first frequency interval and a second frequency interval, select audio signals of higher voice quality that correspond to each frequency interval for splicing, and obtain a target audio signal after fusion of the first audio signal and the second audio signal, so that voice quality of the target audio signal in each frequency interval in the frequency domain is the best, thereby improving voice quality of the target audio signal after fusion.

20 Claims, 7 Drawing Sheets

(51) Int. Cl.

| | |
|---|---|
| ***G10L 25/60*** | (2013.01) |
| ***H04R 1/08*** | (2006.01) |
| ***H04R 3/00*** | (2006.01) |
| *G10L 21/0216* | (2013.01) |

(52) U.S. Cl.
CPC ............... *H04R 1/08* (2013.01); *H04R 3/005* (2013.01); *G10L 2021/02165* (2013.01); *H04R 2410/05* (2013.01)

(58) Field of Classification Search
CPC ...... H04R 1/08; H04R 3/005; H04R 2410/05; H04R 1/1041; H04R 2420/01; H04R 2430/03; H04R 2460/13
See application file for complete search history.

(56) References Cited

U.S. PATENT DOCUMENTS

| | | | | |
|---|---|---|---|---|
| 2012/0278070 | A1 | 11/2012 | Herve et al. | |
| 2014/0363020 | A1* | 12/2014 | Endo | G10L 21/0208 381/98 |
| 2017/0221491 | A1 | 8/2017 | Thesing et al. | |
| 2018/0293997 | A1* | 10/2018 | Du | G10L 21/0216 |
| 2020/0219525 | A1* | 7/2020 | Moon | H04R 1/1016 |
| 2020/0265857 | A1 | 8/2020 | Zhu et al. | |

FOREIGN PATENT DOCUMENTS

| | | | |
|---|---|---|---|
| CN | 111312275 | A | 6/2020 |
| CN | 111951818 | A | 11/2020 |
| JP | 1996-223677 | A | 8/1996 |
| JP | 2000-261534 | A | 9/2000 |
| JP | 2014-239346 | A | 12/2014 |
| JP | 2018-534618 | A | 11/2020 |
| WO | 0021194 | A | 4/2000 |

* cited by examiner

AUDIO SIGNAL GENERATION METHOD AND SYSTEM

RELATED APPLICATIONS

This application is a continuation application of PCT application No. PCT/CN2020/142004, filed on Dec. 31, 2020, and the content of which is incorporated herein by reference in its entirety.

TECHNICAL FIELD

This disclosure relates to the audio signal processing field, and in particular, to an audio generation method and system.

BACKGROUND

In many life scenarios, people are surrounded by noise, and need to perform voice enhancement to have better auditory experience. The voice enhancement may also be referred to as noise suppression, which means to reduce or suppress noise to some extent, so as to improve the quality, intelligibility and the like of a voice surrounded by noise. In a conventional method, generally, a capture device of a signal source is an air-conduction component, that is, an air-conduction microphone. In a high noise scenario, a valid voice signal output by the air-conduction microphone is almost completely surrounded by noise.

Currently, a bone-conduction microphone is used on an electronic product such as a headphone, and there are more and more applications using bone-conduction microphones to receive voice signals. Different from an air-conduction microphone, a bone-conduction component may directly pick a vibration signal of a sound generation part, which can reduce the impact of ambient noise to some extent. In many electronic devices, an air-conduction microphone and a bone-conduction microphone which have different features are combined, the air-conduction microphone is used to pick an external audio signal, the bone-conduction microphone is used to pick a vibration signal of a sound generation part, and voice enhancement processing and fusion are performed on the picked signals. In some scenarios, for example, in a scenario of wind noise or high noise, voice quality can be optimized in this way.

In a solution combining an air-conduction microphone and a bone-conduction microphone, generally, a high-frequency part of a signal picked by the air-conduction microphone and a low-frequency part of a signal picked by the bone-conduction microphone are obtained and then combined to form a final voice signal for outputting. Currently, in most solutions combining an air-conduction microphone and a bone-conduction microphone, a bone-conduction microphone signal corresponding to a frequency lower than a frequency splicing point and an air-conduction microphone signal corresponding to a frequency higher than the frequency splicing point are spliced, so that a combined audio signal is obtained.

However, the signal strength and signal features of different speakers captured by a same bone-conduction microphone or air-conduction microphone under a same ambient noise condition may be different. Signal strength and signal features of a same speaker captured by a same bone-conduction microphone or air-conduction microphone under different ambient noise conditions may also be different. Therefore, it is inappropriate to use a same frequency splicing point for splicing audio signals under different ambient noise conditions or audio signals from different speakers, and voice quality obtained after splicing is also poor.

Therefore, a new audio generation method and system need to be provided in order to select a suitable frequency splicing point based on ambient noise or audio signals of a speaker, and splice and fuse the audio signals to obtain a better voice quality.

SUMMARY

This disclosure provides a new audio generation method and system, to select a frequency splicing point based on ambient noise or audio signals of a speaker, and splice and fuse the audio signals to obtain better voice quality.

According to a first aspect, this disclosure provides an audio generation system, including: at least one storage medium storing a set of instructions for audio generation; and at least one processor in communication with the at least one storage medium, where during operation, the at least one processor executes the set of instructions to: obtain a first audio signal and a second audio signal; and generate a target audio signal based on the first audio signal and the second audio signal, where a frequency domain of the target audio signal includes a first frequency interval and a second frequency interval, in the first frequency interval, the target audio signal includes the first audio signal corresponding to the first frequency interval, an audio signal of the target audio signal in the second frequency interval includes an audio signal of the second audio signal in the second frequency interval, and ranges of the first frequency interval and the second frequency interval are dynamically adjusted based on at least a dynamic change of a first evaluation indicator of the first audio signal in the frequency domain and a dynamic change of a second evaluation indicator of the second audio signal in the frequency domain.

According to a second aspect, this disclosure provides an audio generation method, including: obtaining a first audio signal and a second audio signal; and generating a target audio signal based on the first audio signal and the second audio signal, where a frequency domain of the target audio signal includes a first frequency interval and a second frequency interval, the first frequency interval includes at least one continuous frequency interval, and the second frequency interval includes at least one continuous frequency interval, in the first frequency interval, the target audio signal includes the first audio signal corresponding to the first frequency interval, in the second frequency interval, the target audio signal includes the second audio signal corresponding to the second frequency interval, and ranges of the first frequency interval and the second frequency interval are dynamically adjusted based on at least a dynamic change of a first evaluation indicator of the first audio signal in the frequency domain and a dynamic change of a second evaluation indicator of the second audio signal in the frequency domain.

As can be known from the foregoing technical solutions, the audio generation method and system provided in this disclosure can obtain and compare the evaluation indicators of the first audio signal and the second audio signal corresponding to each frequency in the frequency domain, to compare voice quality of the first audio signal and the second audio signal corresponding to each frequency in the frequency domain; dynamically select a frequency splicing point of an audio signal based on the voice quality, to perform region division on each frequency in the frequency domain; and splice audio signals of higher voice quality that correspond to each frequency interval, to obtain the target audio signal after fusion of the first audio signal and the second audio signal, so that voice quality of the target audio signal in each frequency interval in the frequency domain is the best, thereby improving voice quality of the target audio signal after the fusion. Even in different scenarios, for example, in scenarios in which voice signals of a speaker are different or ambient noise is different, the method and system can also dynamically select a frequency dividing point based on voice quality of the first audio signal and the second audio signal in a current scenario, perform dynamic region division at the frequency, and splice the audio signals, so that voice quality of the target audio signal obtained after fusion is higher.

Other functions of the audio generation method and system provided in this disclosure are partially mentioned in the following descriptions. Based on the descriptions, content described in the following figures and examples would be understandable for a person of ordinary skill in the art. Creative aspects of the audio generation method and system provided in this disclosure may be fully explained by practicing or using the method, apparatus, and a combination thereof in the following detailed examples.

BRIEF DESCRIPTION OF DRAWINGS

To clearly describe the technical solutions in some exemplary embodiments of this disclosure, the following briefly describes the accompanying drawings required for describing these exemplary embodiments. Apparently, the accompanying drawings in the following description show merely some exemplary embodiments of this disclosure, and a person of ordinary skill in the art may derive other drawings from these accompanying drawings without creative efforts.

DETAILED DESCRIPTION

The following description provides specific application scenarios and requirements of this disclosure, in order to enable a person skilled in the art to make or use the contents of this disclosure. For a person skilled in the art, various modifications to the disclosed exemplary embodiments are obvious, and general principles defined herein can be applied to other applications without departing from the scope of this disclosure. Therefore, this disclosure is not limited to the illustrated exemplary embodiments, but is to be accorded the widest scope consistent with the claims.

The terms used herein are only intended to describe specific exemplary embodiments and are not restrictive. For example, unless otherwise clearly indicated in a context, the terms “a”, “an”, and “the” in singular forms may also include plural forms. When used in this disclosure, the terms “comprising”, “including”, and/or “containing” indicate presence of associated integers, steps, operations, elements, and/or components. However, this does not exclude presence of one or more other features, integers, steps, operations, elements, components, and/or groups thereof or addition of other features, integers, steps, operations, elements, components, and/or groups thereof to the system/method.

In view of the following description, these features and other features of this disclosure, operations and functions of related elements of structures, and combinations of components and economics of manufacturing thereof may be significantly improved. With reference to the drawings, all of these form a part of this disclosure. However, it should be understood that the drawings are only for illustration and description purposes and are not intended to limit the scope of this disclosure. It should also be understood that the drawings are not drawn to scale.

Flowcharts provided in this disclosure show operations implemented by the system according to some exemplary embodiments of this disclosure. It should be understood that operations in the flowcharts may not be implemented sequentially. Conversely, the operations may be implemented in a reverse sequence or simultaneously. In addition, one or more other operations may be added to the flowcharts, and one or more operations may be removed from the flowcharts.

To improve voice quality of a voice signal after synthesis, this disclosure provides an audio generation method and system, which can synthesize, based on voice quality of a bone-conduction microphone signal and an air-conduction microphone signal in different application scenarios, the bone-conduction microphone signal and the air-conduction microphone signal to generate a target audio signal, so as to select audio signals of better voice quality on any frequency in a frequency domain, and splice the selected audio signals to obtain a target audio signal, thereby ensuring that the audio signals of the target audio signal on any frequency in the frequency domain are best audio signals.

Figure 1:
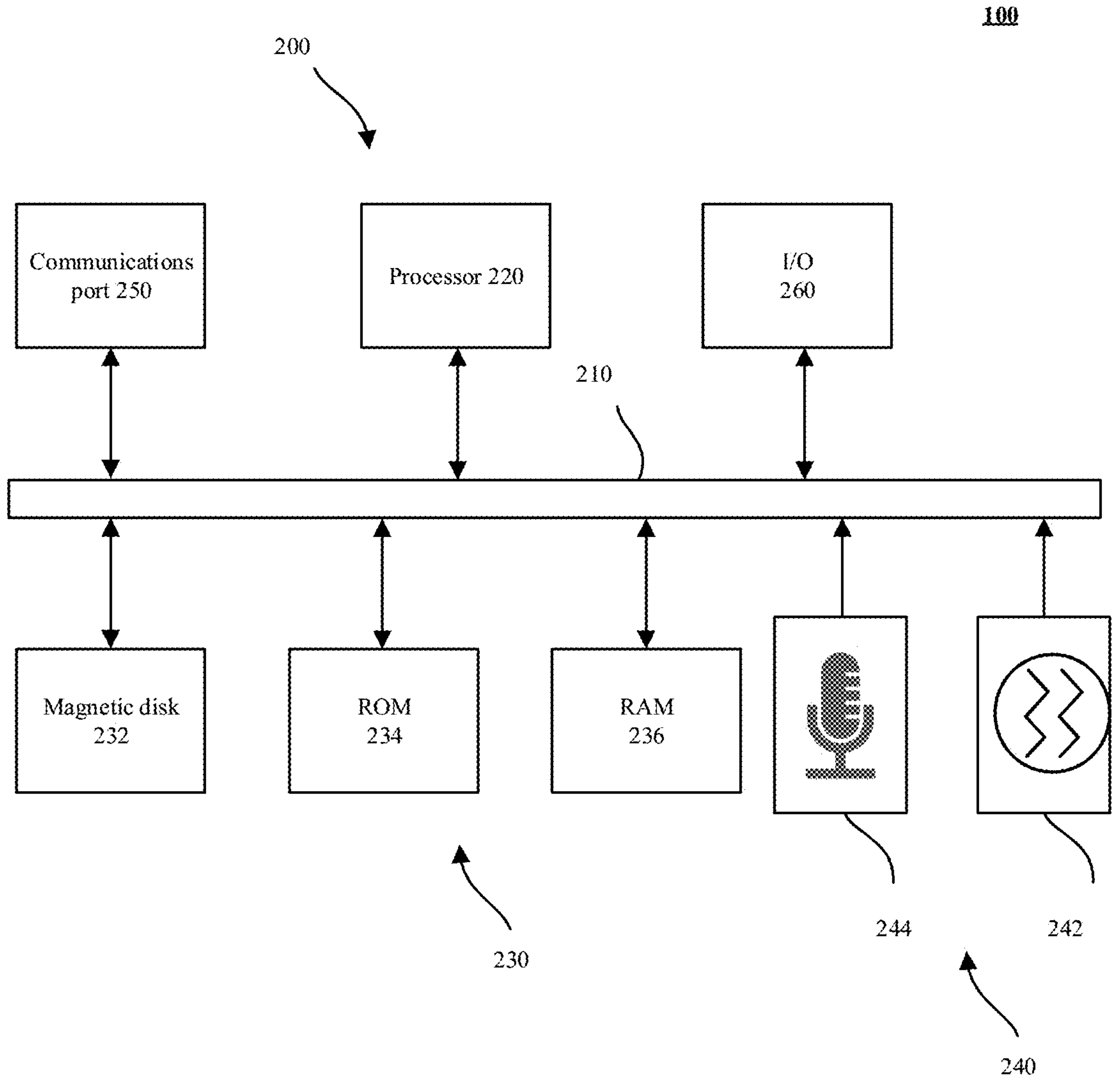
FIG. 1 is a schematic diagram of an audio generation system according to some exemplary embodiments of this disclosure.

FIG. 1 is a schematic diagram of an audio generation system 100 (hereinafter referred to as the system 100). The system 100 may be applied to an electronic device 200.

In some exemplary embodiments, the electronic device 200 may be a wireless head phone, a wired head phone, or an intelligent wearable device, for example, a device having an audio processing function such as smart glasses, a smart helmet, or a smart watch. The electronic device 200 may also be a mobile device, a tablet computer, a notebook computer, a built-in apparatus of a motor vehicle, or the like, or any combination thereof. In some exemplary embodiments, the mobile device may include a smart household device, a smart mobile device, or the like, or any combination thereof. For example, the smart mobile device may include a mobile phone, a personal digital assistant, a game device, a navigation device, an ultra-mobile personal computer (UMPC), or the like, or any combination thereof. In some exemplary embodiments, the smart household device may include a smart TV, a desktop computer, or the like, or any combination thereof. In some exemplary embodiments, the built-in apparatus of the motor vehicle may include a vehicle-mounted computer, a vehicle-mounted television, or the like.

The electronic device 200 may store data or an instruction(s) for performing an audio generation method described in this disclosure, and may execute the data and/or the instruction(s). The electronic device 200 may receive a to-be-processed audio signal, and execute the data or instruction(s) of the audio generation method described in this disclosure to perform synthesis processing on the to-be-processed audio signal, and generate a target audio signal. The audio generation method is described in other parts of this disclosure. For example, the audio generation method is described in the descriptions of FIG. 2 to FIG. 10.

The to-be-processed audio signal may include at least two different audio signals. The audio generation method is used to splice the at least two different audio signals based on voice quality of the at least two different audio signals in a frequency domain, and obtain the target audio signal, so as to improve voice quality of the target audio signal. Specifically, the electronic device 200 may compare voice quality of the at least two different audio signals corresponding to each frequency in the frequency domain, and select audio signals of better voice quality on each frequency for splicing to obtain the target audio signal. Voice quality of corresponding audio signals of the target audio signal on all frequencies in the frequency domain would be the best.

The to-be-processed audio signal may be an audio signal locally stored by the electronic device 200, or may be an audio signal output by an audio capture device of the electronic device 200, or may be an audio signal sent by another device to the electronic device 200, or the like. The audio capture device may be integrated with the electronic device 200, or may be an externally connected device that is in communication with the electronic device 200. The to-be-processed audio signal may be an audio signal on which denoising processing is performed, or may be an audio signal on which denoising processing is not performed. For ease of presentation, in the following descriptions, it is assumed that the to-be-processed audio signal is an audio signal output by the audio capture device of the electronic device 200, and the processed audio signal may be output to a proper device, where the device may be a speaker or a device for further processing of the audio signal.

As shown in FIG. 1, the electronic device 200 may include at least one storage medium 230 and at least one processor 220. In some exemplary embodiments, the electronic device 200 may further include a communications port 250 and an internal communications bus 210. In addition, the electronic device 200 may further include an I/O component 260. In some exemplary embodiments, the electronic device 200 may further include a microphone module 240.

The internal communications bus 210 may connect different system components, including the storage medium 230, the processor 220, and the microphone module 240.

The I/O component 260 supports inputting/outputting between the electronic device 200 and another component. For example, the electronic device 200 may obtain the to-be-processed audio signal by using the I/O component 260.

The communications port 250 is used by the electronic device 200 to perform external data communication. For example, the electronic device 200 may also obtain the to-be-processed audio signal by using the communications port 250.

The at least one storage medium 230 may include a data storage apparatus. The data storage apparatus may be a non-transitory storage medium, or may be a transitory storage medium. For example, the data storage apparatus may include one or more of a magnetic disk 232, a read-only memory (ROM) 234, or a random access memory (RAM) 236. The storage medium 230 may further include at least one instruction set stored in the data storage apparatus, where the instruction set is used for audio generation. The instruction set may be computer program code, where the computer program code may include a program, a routine, an object, a component, a data structure, a process, a module, or the like for performing the audio generation method provided in this disclosure. The at least one storage medium 230 may also store the to-be-processed audio signal.

The at least one processor 220 may be in communication with the at least one storage medium 230 via the internal communications bus 210. The communication may be in any form and capable of directly or indirectly receiving information. The at least one processor 220 may be configured to execute the at least one instruction set. When the system 100 operates, the at least one processor 220 reads the at least one instruction set, and performs, based on an instruction of the at least one instruction set, the audio generation method provided by this disclosure. The processor 220 may perform all steps included in the audio generation method. The processor 220 may be in a form of one or more processors. In some exemplary embodiments, the processor 220 may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), or any other types of circuit or processor that can implement one or more functions, and the like, or any combination thereof. For illustration purposes only, only one processor 220 in the electronic device 200 is described in this disclosure. However, it should be noted that the electronic device 200 in this disclosure may include a plurality of processors. Therefore, operations and/or method steps disclosed in this disclosure may be performed by one processor in this disclosure, or may be performed jointly by a plurality of processors. For example, if the processor 220 of the electronic device 200 in this disclosure performs step A and step B, it should be understood that step A and step B may also be performed jointly or separately by two different processors 220 (for example, the first processor performs step A, and the second processor performs step B, or the first processor and the second processor jointly perform step A and step B).

In some exemplary embodiments, the electronic device 200 may further include the microphone module 240. The microphone module 240 may be an audio capture device of the electronic device 200. The microphone module 240 may be configured to obtain a local audio signal, and output a microphone signal, that is, an electrical signal carrying audio information. The to-be-processed audio signal may be the microphone signal output by the microphone module 240. The microphone module 240 may be in communication with the at least one processor 220 and the at least one storage medium 230. When the to-be-processed audio signal is a microphone signal, and the system 100 is in operation, the at least one processor 220 may read the at least one instruction set, obtain the microphone signal based on the instruction of the at least one instruction set, and perform the audio generation method provided in this disclosure. The microphone module 240 may be integrated with the electronic device 200, or may be a device externally connected to the electronic device 200.

The microphone module 240 may be configured to obtain a local audio signal, and output a microphone signal, that is, an electrical signal carrying audio information. The microphone module 240 may be an out-of-ear microphone module or may be an in-ear microphone module. For example, the microphone module 240 may be a microphone disposed out of an auditory canal, or may be a microphone disposed in an auditory canal. The microphone module 240 may include at least one first-type microphone 242 and at least one second-type microphone 244. The first-type microphone 242 may be different from the second-type microphone 244. The first-type microphone 242 may be a microphone directly capturing a human body vibration signal, for example, a bone-conduction microphone. The second-type microphone 244 may be a microphone directly capturing an air vibration signal, for example, an air-conduction microphone. Certainly, the microphone module 240 may also be another type of microphone. For example, the first-type microphone 242 may be an optical microphone; and the second-type microphone 244 may be a microphone for receiving an electromyographic signal. For ease of presentation, in the following descriptions of the present disclosure, the bone-conduction microphone is used as an example of the first-type microphone 242, and the air-conduction microphone is used as an example of the second-type microphone 244 for description.

The bone-conduction microphone may include a vibration sensor, for example, an optical vibration sensor or an acceleration sensor. The vibration sensor may capture a mechanical vibration signal (for example, a signal generated by a vibration generated by the skin or bones when a user speaks), and convert the mechanical vibration signal into an electrical signal. Herein, the mechanical vibration signal mainly refers to a vibration propagated by a solid. The bone-conduction microphone captures, by touching the skin or bones of the user via the vibration sensor or a vibration component connected to the vibration sensor, a vibration signal generated by the bones or skin when the user makes sound, and converts the vibration signal into an electrical signal. In some exemplary embodiments, the vibration sensor may be a device that is sensitive to a mechanical vibration but insensitive to an air vibration (that is, a capability of responding to the mechanical vibration by the vibration sensor exceeds a capability of responding to the air vibration by the vibration sensor). Because the bone-conduction microphone can directly pick a vibration signal of a sound generation part, the bone-conduction microphone can reduce impact of ambient noise.

The air-conduction microphone captures an air vibration signal caused when a user makes sound, and converts the air vibration signal into an electrical signal. The air-conduction microphone may be a separate air-conduction microphone, or may be a microphone array including two or more air-conduction microphones. The microphone array may be a beamforming microphone array or another similar microphone array. Sounds coming from different directions or positions may be captured by using the microphone array.

For an audio signal output by the bone-conduction microphone at a low frequency, impact of noise can be effectively reduced. Therefore, the voice quality of the audio signal output by the bone-conduction microphone at a low frequency is superior to the voice quality of an audio signal output by the air-conduction microphone at the low frequency. In a high-frequency region, the voice quality of an audio signal output by the bone-conduction microphone is inferior to the voice quality of an audio signal output by the air-conduction microphone. In addition, the audio signal output by the air-conduction microphone is stable in every frequency band.

The first-type microphone 242 may output a first audio signal. The second-type microphone 244 may output a second audio signal. The to-be-processed audio signal may include the first audio signal and the second audio signal.

The audio generation method provided in this disclosure can use the first audio signal and the second audio signal to synthesize a target audio signal. The first audio signal may be an audio signal directly output by the first-type microphone 242, or may be an audio signal obtained after denoising processing is performed on an audio signal directly output by the first-type microphone 242. The second audio signal may be an audio signal directly output by the second-type microphone 244, or may be an audio signal obtained after denoising processing is performed on an audio signal directly output by the second-type microphone 244. It should be noted that when the first audio signal is an audio signal directly output by the first-type microphone 242, the second audio signal is also an audio signal directly output by the second-type microphone 244. When the first audio signal is an audio signal obtained after denoising processing is performed on an audio signal directly output by the first-type microphone 242, the second audio signal is also an audio signal obtained after denoising processing is performed on an audio signal directly output by the second-type microphone 244. Denoising processing methods for the first audio signal and the second audio signal may be the same or may be different.

When there are a plurality of first-type microphones 242, the first audio signal is an audio signal obtained after fusion of individual microphone audio signals output by the plurality of first-type microphones 242. When there are a plurality of second-type microphones 244, the second audio signal is an audio signal obtained after fusion of individual microphone audio signals output by the plurality of second-type microphones 244.

For example, when there is one first-type microphone 242 and there is also one second-type microphone 244, the first audio signal may be an audio signal directly output by the first-type microphone 242, and in this case, the second audio signal is also an audio signal directly output by the second-type microphone 244; or the first audio signal may be an audio signal obtained after denoising processing is performed on an audio signal directly output by the first-type microphone 242, and the second audio signal may be an audio signal obtained after denoising processing is performed on an audio signal directly output by the second-type microphone 244.

For example, when there is one first-type microphone 242 and there are a plurality of second-type microphones 244, the first audio signal may be an audio signal directly output by the first-type microphone 242, and in this case, the second audio signal is an audio signal obtained after single-microphone denoising and signal fusion are performed on audio signals directly output by the plurality of microphones in the second-type microphones 244; or the first audio signal may be an audio signal obtained after denoising processing is performed on an audio signal directly output by the first-type microphone 242, and the second audio signal is an audio signal obtained after multi-microphone denoising processing is performed after single-microphone denoising and signal fusion are performed on audio signals directly output by the plurality of microphones in the second-type microphones 244. An algorithm for the denoising processing may be a conventional voice denoising algorithm, for example, at least one or any combination of a spectral subtraction method, a Wiener filtering method, an MMSE algorithm, and an MMSE-based improved algorithm.

Especially for a second-type microphone 244 including a plurality of air-conduction microphones, after denoising processing is performed on an audio signal directly output by the second-type microphone 244, the voice quality can be improved significantly. Therefore, selecting the audio signal obtained after denoising processing is performed on the audio signal directly output by the second-type microphone 244 as the second audio signal can improve efficiency of audio generation and improve voice quality of the target audio signal, while reducing a calculation amount and reducing calculation costs.

The system 100 may perform further denoising processing on the target audio signal in order to improve voice quality of the target audio signal. The system 100 may first perform denoising processing on the first audio signal and the second audio signal, and then perform voice synthesis to generate the target audio signal, or may first synthesize the first audio signal and the second audio signal into the target audio signal, and then perform denoising processing thereon.

Figure 2:
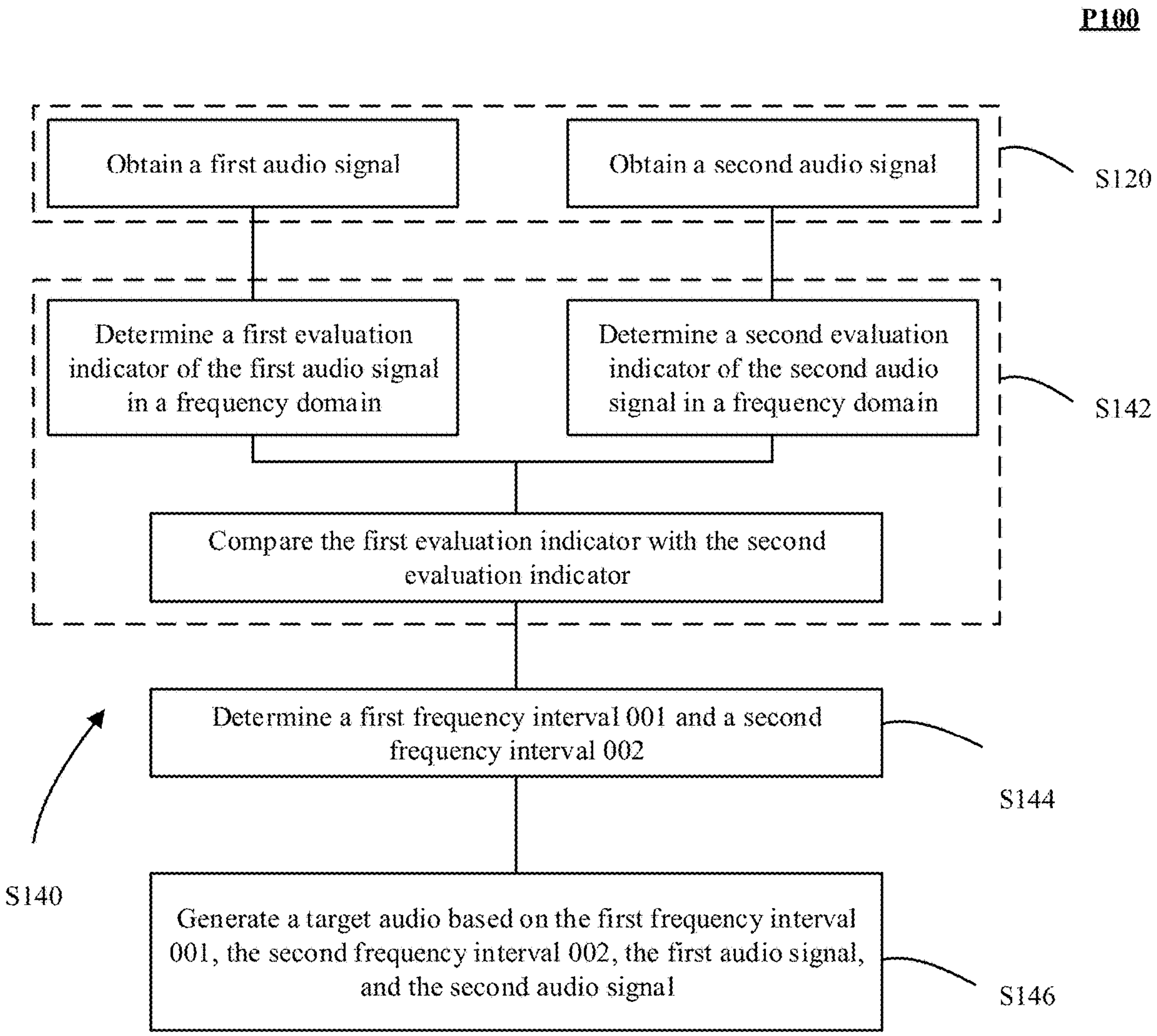
FIG. 2 is a flowchart of an audio generation method according to some exemplary embodiments of this disclosure.

FIG. 2 is a flowchart of an audio generation method P100 according to some exemplary embodiments of this disclosure. In the method P100, the first audio signal and the second audio signal may be synthesized into an audio signal of a higher voice quality. Specifically, in the method P100, based on voice quality of the first audio signal and the second audio signal in a frequency domain, audio signals of higher voice quality may always be selected for splicing, so as to obtain a target audio signal. As shown in FIG. 2, the method P100 may include the following steps.

S120. An electronic device 200 obtains a first audio signal and a second audio signal.

As described above, the first audio signal and the second audio signal are different audio signals. The first audio signal and the second audio signal have different features. In addition, the first audio signal and the second audio signal have different voice quality in a frequency domain. Assuming that the first audio signal is an audio signal output by a bone-conduction microphone and that the second audio signal is an audio signal output by an air-conduction microphone, the first audio signal has higher voice quality in a low-frequency part, and the voice quality of the second audio signal in a high-frequency part is higher than the voice quality of the first audio signal in the high-frequency part. Certainly, the first audio signal and the second audio signal may also be audio signals of other types, for example, an audio signal output by an optical microphone, an audio signal output by a microphone receiving an electromyographic signal, and so on.

S140. The electronic device 200 generates a target audio signal based on the first audio signal and the second audio signal. Specifically, step S140 may include:

S142. The electronic device 200 determines a first evaluation indicator of the first audio signal in the frequency domain and a second evaluation indicator of the second audio signal in the frequency domain, and makes a comparison therebetween.

During synthesis of the first audio signal and the second audio signal, voice quality of the first audio signal and that of the second audio signal may be compared, so that the audio signal of a better voice quality may be selected for splicing. Specifically, the electronic device 200 may use an evaluation indicator to represent the voice quality of a to-be-processed audio signal. The first evaluation indicator may represent the voice quality of the first audio signal, and the first evaluation indicator may be in a positive correlation with the voice quality of the first audio signal. The second evaluation indicator represents the voice quality of the second audio signal, and the second evaluation indicator may be in a positive correlation with voice quality of the second audio signal.

During evaluation of the voice quality of the to-be-processed audio signal, the evaluation may be performed by using the signal strength of a valid audio signal included in the to-be-processed audio signal. The valid audio signal may be an important audio signal carried by the audio signal. Noise signal may be another audio signal than the valid audio signal. For example, during a voice call, the valid audio signal may be a human voice signal when a user of the call speaks, and the noise signal may be ambient noise, for example, sound of a vehicle, sound of whistling horn, etc. When special sound is collected, for example, when sound of chirping is captured, the valid audio signal may be an audio signal of chirping, and the noise signal may be sound of a wind, sound of water, or the like. For ease of description, a voice call is taken as an example for description herein, where the valid audio signal is a human voice signal when a user of the call speaks, and the noise signal may be ambient noise. The voice quality of the to-be-processed audio signal may be evaluated by using the strength of a valid voice signal included in the to-be-processed audio signal. For example, in the case where the valid audio signal is a human voice signal, the higher the strength of the valid voice signal, the higher the intelligibility of the valid voice signal, and the higher the voice quality of the to-be-processed audio signal.

It should be noted that the noise signal and the valid audio signal are both signals obtained by using an estimation algorithm(s), rather than an accurate valid audio signal and noise signal. The noise signal may be estimated by using a noise estimation algorithm. The valid audio signal may be obtained through estimation by subtracting the noise signal from the original to-be-processed audio signal.

Specifically, the strength of the valid audio signal may be evaluated by using the evaluation indicator. The evaluation indicator may be a signal-to-noise ratio of the to-be-processed audio signal. The first evaluation indicator may be a first signal-to-noise ratio corresponding to the first audio signal, and the second evaluation indicator may be a second signal-to-noise ratio corresponding to the second audio signal. The first signal-to-noise ratio may be a proportion of the valid audio signal(s) to the noise signal(s) in the first audio signal. The second signal-to-noise ratio may be a proportion of the valid audio signal(s) to the noise signal(s) in the second audio signal. The higher the first signal-to-noise ratio of the first audio signal, that the higher a proportion of valid audio signals of a current frequency and the higher the voice quality of the first audio signal. Similarly, the higher the second signal-to-noise ratio of the second audio signal, that the higher a proportion of valid audio signals on a current frequency, and the higher the voice quality of the second audio signal. That the first evaluation indicator (value) is higher than the second evaluation indicator (value) may be that a value of the first signal-to-noise ratio is higher than a value of the second signal-to-noise ratio.

Certainly, the voice quality of the to-be-processed audio signal may also be evaluated directly using a valid voice signal included in the to-be-processed audio signal. In other words, the evaluation indicator may also be the valid voice signal. That the first evaluation indicator is higher than the second evaluation indicator corresponding to the second audio signal may be that a strength value of a first valid voice signal in the first audio signal is higher than a strength value of a second valid voice signal in the second audio signal. Certainly, the evaluation indicator may also be a noise signal in the to-be-processed audio signal. That the first evaluation indicator is higher than the second evaluation indicator in the second audio signal may be that a strength value of a first noise signal corresponding to the first audio signal is lower than a strength value of a second noise signal in the second audio signal. Certainly, the evaluation indicator may also be strength of a noise signal in the to-be-processed audio signal. For ease of presentation, in the following descriptions, it is assumed that the evaluation indicator is a signal-to-noise ratio, and that the first evaluation indicator is the first signal-to-noise ratio corresponding to the first audio signal, and that the second evaluation indicator is the second signal-to-noise ratio corresponding to the second audio signal. A person skilled in the art would understand that all other parameters that can be used to evaluate voice quality may be used as the first evaluation indicator and the second evaluation indicator.

The signal-to-noise ratio is a parameter related to a frequency. Signal-to-noise ratios corresponding to audio signals of different frequencies may be different. Specifically, the determining of the first evaluation indicator of the first audio signal in the frequency domain and the second evaluation indicator of the second audio signal in the frequency domain in step S142 may include: determining a first signal-to-noise ratio of the first audio signal corresponding to each frequency in the frequency domain and a second signal-to-noise ratio of the second audio signal corresponding to each frequency in the frequency domain.

To obtain the first evaluation indicator of the first audio signal and the second evaluation indicator of the second audio signal, a system 100 may first separately divide the first audio signal and the second audio signal into frames. A frame is a basic unit forming an audio signal. During data processing of an audio signal, frames may be generally used as basic units for calculation. The first audio signal and the second audio signal may respectively include one or more audio frames. An audio frame may include an audio signal of a preset duration. An audio signal in each audio frame is stable. Adjacent audio frames may partially overlap. The preset duration may be 20-50 milliseconds, for example, 20 milliseconds, 25 milliseconds, 30 milliseconds, 40 milliseconds, or 50 milliseconds. Certainly, the preset duration may also be longer or shorter. Durations of different audio frames may be the same or may be different.

Each audio frame may be formed by superimposition of signals of a plurality of frequencies. To obtain the first evaluation indicator of the first audio signal corresponding to each frequency in the frequency domain and the evaluation indicator of the second audio signal corresponding to each frequency in the frequency domain, the system 100 may perform Fourier transform on the audio frame(s) to obtain signal distribution of each frequency in the audio frame(s). The signal distribution of each frequency may be the strength of audio signals corresponding to each frequency in the audio frame.

Figure 3:
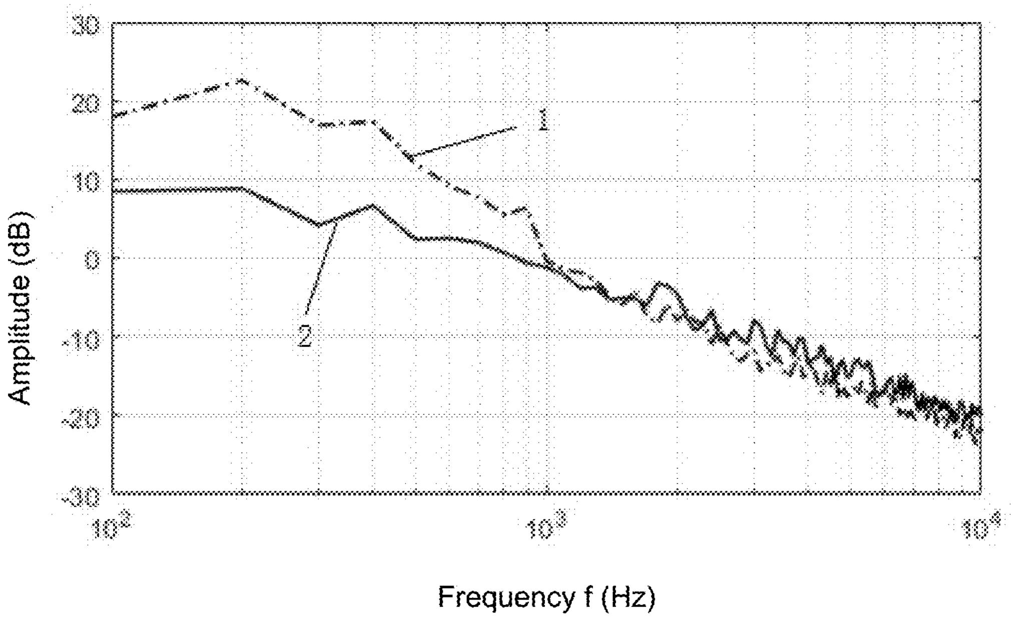
FIG. 3 is a schematic spectrum diagram of a first audio signal and a second audio signal according to some exemplary embodiments of this disclosure.

FIG. 3 is a schematic spectrum diagram of the first audio signal and the second audio signal according to some exemplary embodiments of this disclosure. FIG. 3 is a schematic spectrum diagram corresponding to one audio frame in the first audio signal and the second audio signal. The schematic spectrum diagram may be a diagram of a correspondence between a frequency and the strength of an audio signal in an audio frame. As shown in FIG. 3, an x-axis shows the frequency, and a y-axis shows a signal amplitude. A curve 1 is a spectrum diagram corresponding to the first audio signal, and a curve 2 is a spectrum diagram corresponding to the second audio signal. FIG. 3 is only an example for description. A person skilled in the art would understand that the curve 1 and the curve 2 corresponding to different audio frames may be different, that the curve 1 and the curve 2 may change dynamically, and that the curve 1 and the curve 2 may be spectrum curves in any form.

Figure 4:
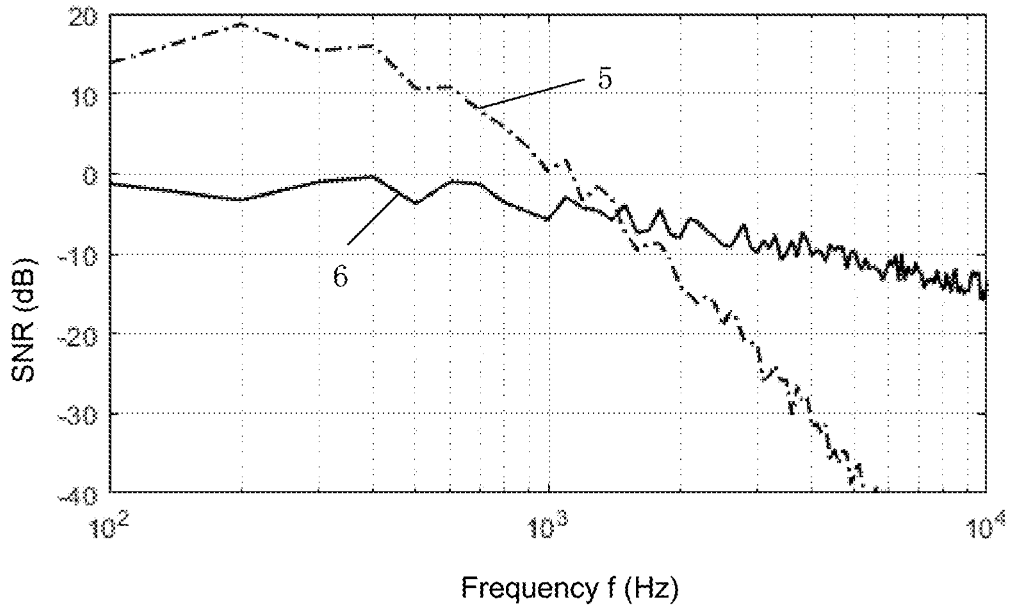
FIG. 4 is a schematic diagram of a first signal-to-noise ratio and a second signal-to-noise ratio according to some exemplary embodiments of this disclosure.

FIG. 4 is a schematic diagram of the first signal-to-noise ratio and the second signal-to-noise ratio according to some exemplary embodiments of this disclosure. In FIG. 4, a y-axis shows a signal-to-noise ratio SNR, and an x-axis shows a frequency f. A curve 5 is a curve of the first signal-to-noise ratio corresponding to each frequency of the first audio signal. A curve 6 is a curve of the second signal-to-noise ratio corresponding to each frequency of the second audio signal.

As shown in FIG. 4, it can be seen through a comparison between the curve 5 and the curve 6 that the first signal-to-noise ratio of the first audio signal is higher than the second signal-to-noise ratio of the second audio signal in a low-frequency region, and that the first signal-to-noise ratio of the first audio signal is lower than the second signal-to-noise ratio of the second audio signal in a high-frequency region. In other words, the voice quality of the first audio signal is higher than the voice quality of the second audio signal in the low-frequency region, and the voice quality of the first audio signal is lower than the voice quality of the second audio signal in the high-frequency region.

The first signal-to-noise ratio and the second signal-to-noise ratio corresponding to different audio frames may be different. The first signal-to-noise ratio and the second signal-to-noise ratio may change dynamically. Likewise, the first evaluation indicator and the second evaluation indicator may also change dynamically.

It should be noted that FIG. 4 is only an example for description. The curve 5 and the curve 6 in FIG. 4 are described by using an example in which the first audio signal is an output signal of a bone-conduction microphone and the second audio signal is an output signal of an air-conduction microphone. The output signal of the bone-conduction microphone has a high signal-to-noise ratio and a good voice quality in a low-frequency region, but has a low signal-to-noise ratio and a poor voice quality in a high-frequency region. The output signal of the air-conduction microphone in each frequency band is stable. A person skilled in the art would understand that when the first audio signal and the second audio signal are audio signals output by microphones of other types, a relative relationship between the curve 5 and the curve 6 may be different. A person skilled in the art also understand that schematic diagrams of the first signal-to-noise ratio and the second signal-to-noise ratio of all types fall within the scope of protection of this disclosure.

Step S140 may further include:

S144. The electronic device 200 determines at least one target frequency based on at least a comparison result between the first evaluation indicator and the second evaluation indicator, thereby determining a first frequency interval 001 and a second frequency interval 002.

As described above, in the method P100, during synthesis of the first audio signal and the second audio signal, audio signals of higher voice quality that correspond to each frequency in the frequency domain may be spliced. Therefore, in the method P100, the voice quality of the first audio signal and that of the second audio signal in the frequency domain may be compared by comparing the evaluation indicator of the first audio signal and that of the second audio signal in the frequency domain. Specifically, step S144 may include: the electronic device 200 divides the frequency domain into the first frequency interval 001 and the second frequency interval 002 based on a voice quality change of the first audio signal in the frequency domain and a voice quality change of the second audio signal in the frequency domain, so that the voice quality of the first audio signal may be higher than the voice quality of the second audio signal in the first frequency interval 001, and that the voice quality of the first audio signal may be lower than the voice quality of the second audio signal in the second frequency interval 002. It is noted that the first frequency interval may only include the first audio signal; and the second frequency interval may only include the second audio signal. The ranges of the first frequency interval 001 and the second frequency interval 002 may be dynamically adjusted based on a dynamic change of the first evaluation indicator of the first audio signal in the frequency domain and a dynamic change of the second evaluation indicator of the second audio signal in the frequency domain. The frequency domain includes the first frequency interval 001 and the second frequency interval 002. Each of the at least one target frequency is a frequency corresponding to a connection point between the first frequency interval 001 and the second frequency interval 002 (i.e., a frequency point connecting the first frequency interval 001 and the second frequency interval 002).

In some exemplary embodiments, in the method P100, frequencies in the frequency domain may be divided into the first frequency interval 001 and the second frequency interval 002 based on the comparison result between the first evaluation indicator of the first audio signal and the second evaluation indicator of the second audio signal. When the first evaluation indicator of the first audio signal is higher than the second evaluation indicator of the second audio signal, it indicates that voice quality of the first audio signal is higher than that of the second audio signal. In this case, a frequency interval corresponding to the first evaluation indicator being higher than the second evaluation indicator is determined as the first frequency interval 001. A frequency interval other than the first frequency interval 001 is determined as the second frequency interval 002.

In some exemplary embodiments, in the method P100, frequencies in the frequency domain may be divided into the first frequency interval 001 and the second frequency interval 002 based on the comparison result between the first evaluation indicator and the second evaluation indicator and a comparison result between the first evaluation indicator and an absolute evaluation indicator threshold. When the first evaluation indicator is higher than the second evaluation indicator, this may not certainly indicate that the voice quality of the first audio signal is higher than that of the second audio signal. For example, when a signal-to-noise ratio of an audio signal output by the bone-conduction microphone is higher than a signal-to-noise ratio of an audio signal output by the air-conduction microphone, and the signal-to-noise ratio of the audio signal output by the bone-conduction microphone is low and is lower than a signal-to-noise ratio threshold, the voice quality of the audio signal output by the bone-conduction microphone may be lower than the voice quality of the audio output by the air-conduction microphone. Therefore, in some exemplary embodiments, and especially in some exemplary embodiments in which the first audio signal is an audio signal output by the bone-conduction microphone, in the method P100, frequencies in the frequency domain may be divided into the first frequency interval 001 and the second frequency interval 002 based on the comparison result between the first evaluation indicator and the second evaluation indicator and a comparison result between the first evaluation indicator and an absolute evaluation indicator threshold. Therefore, accuracy of region division is improved, and voice quality of the target audio signal is also improved. As described above, the first evaluation indicator may be the first signal-to-noise ratio, and the second evaluation indicator may be the second signal-to-noise ratio. The absolute evaluation indicator threshold may be a signal-to-noise ratio threshold.

Figure 5:
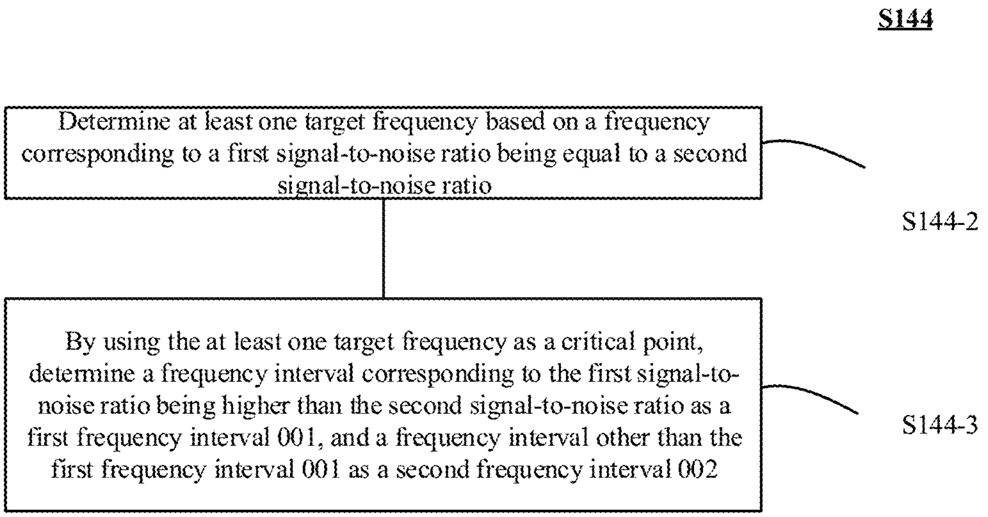
FIG. 5 is a flowchart for determining a first frequency interval and a second frequency interval according to some exemplary embodiments of this disclosure.

FIG. 5 is a flowchart for determining the first frequency interval 001 and the second frequency interval 002 according to some exemplary embodiments of this disclosure. In the schematic diagram shown in FIG. 5, in the method P100, the frequencies in the frequency domain may be divided into the first frequency interval 001 and the second frequency interval 002 based on a comparison result between the first signal-to-noise ratio and the second signal-to-noise ratio. As shown in FIG. 5, step S144 may include:

S144-2. The electronic device 200 determines the at least one target frequency based on a frequency corresponding to the first signal-to-noise ratio being equal to the second signal-to-noise ratio.

S144-3. By using the at least one target frequency as a critical point, the electronic device 200 determines a frequency interval corresponding to the first signal-to-noise ratio being higher than the second signal-to-noise ratio as the first frequency interval 001, and a frequency interval other than the first frequency interval 001 as the second frequency interval 002.

Figure 6:
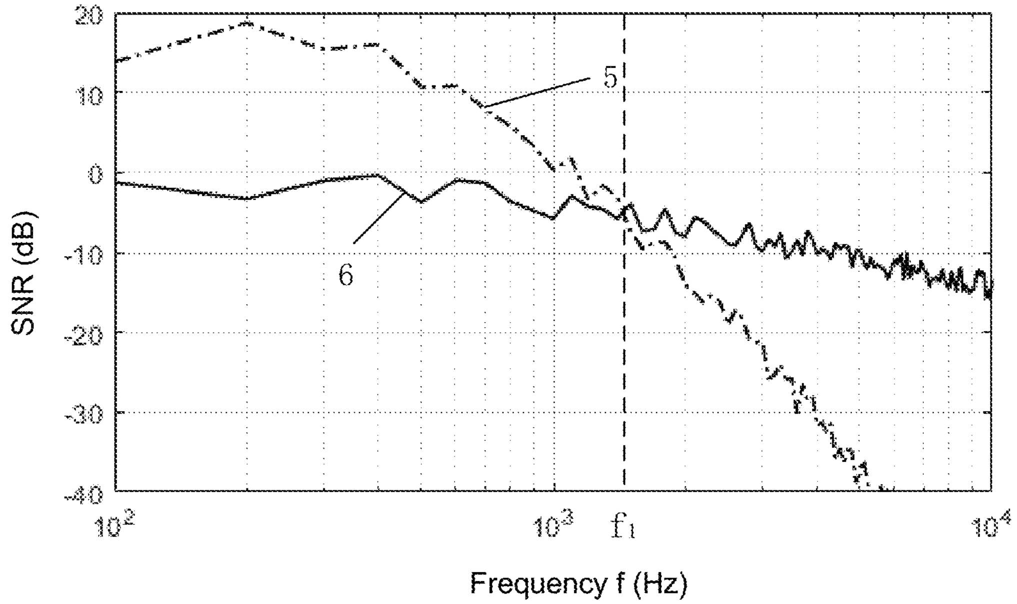
FIG. 6 is a schematic diagram of a first frequency interval and a second frequency interval according to some exemplary embodiments of this disclosure.

FIG. 6 is a schematic diagram of the first frequency interval 001 and the second frequency interval 002 according to some exemplary embodiments of this disclosure. FIG. 6 is a schematic diagram of frequency interval division performed on a basis of FIG. 4. FIG. 6 corresponds to FIG. 5. As shown in FIG. 6, for ease of description, a frequency corresponding to an intersection between the curve 5 and the curved 6 may be defined as a first target frequency $f_1$. To be specific, the first target frequency $f_1$ may be a frequency (or frequencies) where the first signal-to-noise ratio is equal to the second signal-to-noise ratio.

In some exemplary embodiments, each of the at least one target frequency may be the first target frequency $f_1$. In some exemplary embodiments, each of the at least one target frequency may be any frequency in a frequency interval of a preset width in a vicinity of the first target frequency $f_1$, that is, any frequency in the frequency interval of the preset width near the frequency where the first signal-to-noise ratio is equal to the second signal-to-noise ratio. The preset width may be a preset frequency width.

By using the at least one target frequency as the critical point, the electronic device 200 may determine the frequency interval where the first signal-to-noise ratio is higher than the second signal-to-noise ratio as the first frequency interval 001, and the frequency interval other than the first frequency interval 001 as the second frequency interval 002. As shown in FIG. 6, in a region whose frequency is lower than the first target frequency $f_1$, the first signal-to-noise ratio may be higher than the second signal-to-noise ratio, that is, the voice quality of the first audio signal is higher than the voice quality of the second audio signal. In a region whose frequency is higher than the first target frequency $f_1$, the first signal-to-noise ratio is lower than the second signal-to-noise ratio, that is, the voice quality of the first audio signal is lower than the voice quality of the second audio signal. The region whose frequency is lower than the first target frequency $f_1$ may be defined as the first frequency interval 001, and the region whose frequency is higher than the first target frequency $f_1$ may be defined as the second frequency interval 002.

The first frequency interval 001 may include at least one continuous frequency interval. The second frequency interval 002 may include at least one continuous frequency interval. FIG. 6 shows only one first target frequency $f_1$. A person skilled in the art would understand that there may be a plurality of first target frequencies $f_1$ based on different first audio signals and second audio signals. When there are a plurality of first target frequencies $f_1$, there may also be a plurality of corresponding target frequencies; and the first frequency interval 001 may include a plurality of continuous frequency intervals, and the second frequency interval 002 may also include a plurality of continuous frequency intervals.

Figure 7:
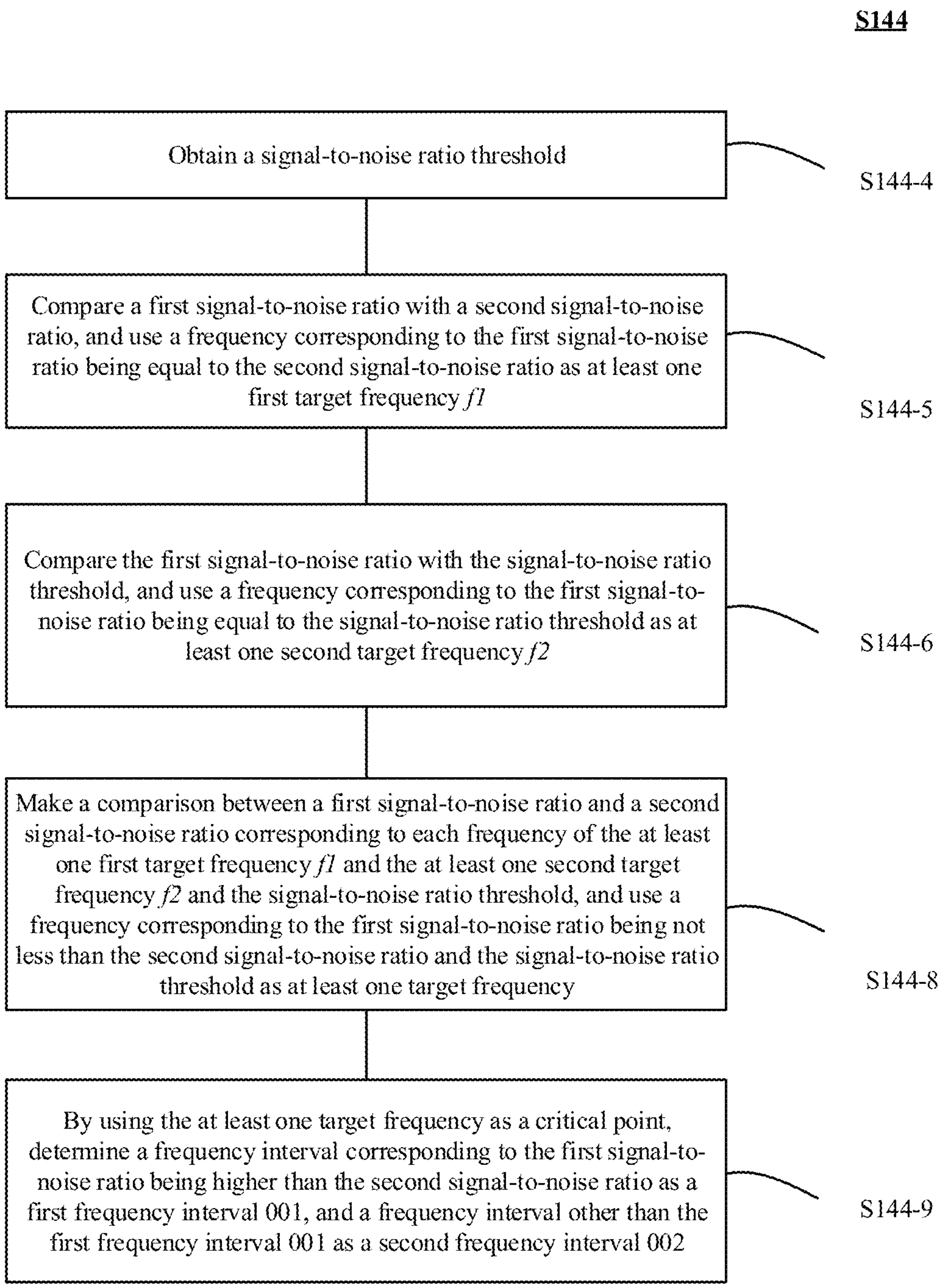
FIG. 7 is a flowchart for determining a first frequency interval and a second frequency interval according to some exemplary embodiments of this disclosure.

FIG. 7 is a flowchart for determining the first frequency interval 001 and the second frequency interval 002 according to some exemplary embodiments of this disclosure. In the schematic diagram shown in FIG. 7, in the method P100, the frequencies in the frequency domain may be divided into the first frequency interval 001 and the second frequency interval 002 based on a comparison result between the first signal-to-noise ratio and the second signal-to-noise ratio, and a comparison result between the first signal-to-noise ratio and the signal-to-noise ratio threshold. As shown in FIG. 7, step S144 may include the following steps.

S144-4, obtain the signal-to-noise ratio threshold.

S144-5, the electronic device 200 compares the first signal-to-noise ratio with the second signal-to-noise ratio, and determines a frequency where first signal-to-noise ratio is equal to the second signal-to-noise ratio as at least one first target frequency $f_1$.

S144-6, the electronic device 200 compares the first signal-to-noise ratio with the signal-to-noise ratio threshold, and determines a frequency where the first signal-to-noise ratio is equal to the signal-to-noise ratio threshold as at least one second target frequency $f_2$.

S144-8, the electronic device 200 makes a comparison between a first signal-to-noise ratio and a second signal-to-noise ratio corresponding to each frequency of the at least one first target frequency $f_1$ and the at least one second target frequency $f_2$ and the signal-to-noise ratio threshold, and determines a frequency where the first signal-to-noise ratio is not less than the second signal-to-noise ratio and the signal-to-noise ratio threshold as the at least one target frequency.

S144-9. By using the at least one target frequency as a critical point, the electronic device 200 determines a frequency interval where the first signal-to-noise ratio is higher than the second signal-to-noise ratio as the first frequency interval, and a frequency interval other than the first frequency interval as the second frequency interval.

Figure 8:
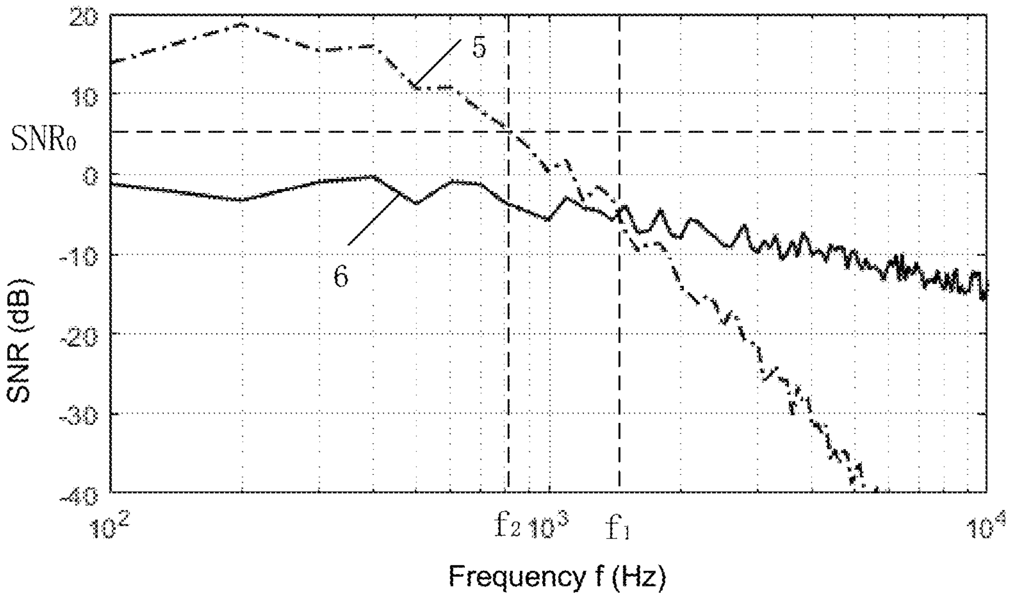
FIG. 8 is a schematic diagram of a first frequency interval and a second frequency interval according to some exemplary embodiments of this disclosure.

FIG. 8 is a schematic diagram of the first frequency interval and the second frequency interval according to some exemplary embodiments of this disclosure. FIG. 8 is a schematic diagram of frequency interval division performed on a basis of FIG. 4. FIG. 8 corresponds to FIG. 7. As shown in FIG. 8, for ease of description, $SNR_0$ is defined as the signal-to-noise ratio threshold. A first target frequency $f_1$ is a frequency where the first signal-to-noise ratio is equal to the second signal-to-noise ratio, that is, a frequency corresponding to an intersection between the curve 5 and the curve 6. A second target frequency $f_2$ is a frequency where the first signal-to-noise ratio is equal to the signal-to-noise ratio threshold $SNR_0$, that is, a frequency corresponding to an intersection between the curve 5 and the signal-to-noise ratio threshold $SNR_0$.

The signal-to-noise ratio threshold $SNR_0$ may be any value, and may be prestored in at least one storage medium 230. The signal-to-noise ratio threshold $SNR_0$ may be set or modified manually. The signal-to-noise ratio threshold $SNR_0$ may be further obtained by machine learning. For example, the signal-to-noise ratio threshold $SNR_0$ may be 3 dB, may be 6 dB, or may be another value. For different types of the first audio signals, the signal-to-noise ratio threshold $SNR_0$ may be different.

The electronic device 200 may make a comparison between the first signal-to-noise ratio and the second signal-to-noise ratio corresponding to each frequency of the at least one first target frequency $f_1$, the at least one second target frequency $f_2$ and the signal-to-noise ratio threshold $SNR_0$, and determine a frequency where the first signal-to-noise ratio is not less than the second signal-to-noise ratio and the signal-to-noise ratio threshold $SNR_0$ as the at least one target frequency. Taking FIG. 8 as an example, FIG. 8 shows one first target frequency $f_1$ and one second target frequency $f_2$. The electronic device 200 may compare first signal-to-noise ratios and second signal-to-noise ratios corresponding to the first target frequency $f_1$, the second target frequency $f_2$, and the signal-to-noise ratio threshold $SNR_0$. A first signal-to-noise ratio corresponding to the first target frequency $f_1$ may be equal to a second signal-to-noise ratio corresponding to the first target frequency $f_1$, but may be less than the signal-to-noise ratio threshold $SNR_0$. A first signal-to-noise ratio corresponding to the second target frequency $f_2$ may be greater than a second signal-to-noise ratio corresponding to the second target frequency $f_2$, and may be equal to the signal-to-noise ratio threshold $SNR_0$. Therefore, the second target frequency $f_2$ may be used as the target frequency. In a region lower than the second target frequency $f_2$, the first signal-to-noise ratio is higher than the second signal-to-noise ratio and is greater than the signal-to-noise ratio threshold $SNR_0$, which proves that the voice quality of the first audio signal is higher than that of the second audio signal. In this case, a frequency interval corresponding to a frequency interval lower than the second target frequency $f_2$ may be defined as the first frequency interval 001, and a region higher than the second target frequency $f_2$ may be defined as the second frequency interval 002.

The first frequency interval 001 may include at least one continuous frequency interval. The second frequency interval 002 may include at least one continuous frequency interval. FIG. 8 shows only one first target frequency $f_1$ and one second target frequency $f_2$. A person skilled in the art would understand that there may be a plurality of first target frequencies $f_1$ and second target frequencies $f_2$ based on different first audio signals and second audio signals, and there may also be a plurality of corresponding target frequencies. When there are a plurality of target frequencies, the first frequency interval 001 may include a plurality of continuous frequency intervals, and the second frequency interval 002 may also include a plurality of continuous frequency intervals.

As shown in FIG. 4 to FIG. 8, the first signal-to-noise ratio and the second signal-to-noise ratio may oscillate in a small range. In other words, the first signal-to-noise ratios and second signal-to-noise ratios corresponding to a plurality of frequencies in the small range may be equal. To prevent an oscillation result of the signal-to-noise ratio from affecting accuracy of audio generation, a frequency interval width may be preset. When distances between the plurality of frequencies are in the frequency interval width, the target frequency may be any one of the plurality of frequencies, may be one of the plurality of frequencies that corresponds to the largest first signal-to-noise ratio, or may be an average value of the plurality of frequencies, or the like.

Step S140 may further include:

S146. The electronic device 200 generates the target audio signal based on the first frequency interval 001, the second frequency interval 002, the first audio signal, and the second audio signal.

Specifically, in step S146, the electronic device 200 may synthesize an audio signal located in the first frequency interval 001 in the first audio signal and an audio signal located in the second frequency interval 002 in the second audio signal to obtain the target audio signal. Specifically, in the frequency domain, the audio signal of the target audio signal in the first frequency interval 001 may include the audio signal of the first audio signal in the first frequency interval, and the audio signal of the target audio signal in the second frequency interval 002 may include the audio signal of the second audio signal in the second frequency interval.

In some exemplary embodiments, the strength of the first audio signal and the strength of the second audio signal of the target frequency may be different. Splicing the audio signal located in the first frequency interval 001 in the first audio signal and the audio signal located in the second frequency interval 002 in the second audio signal may cause signal discontinuity at the target frequency. To avoid signal discontinuity, step S146 may include:

S146-2. Within a present range of each of the at least one target frequency, the electronic device 200 performs smoothing processing over the first audio signal and the second audio signal, so that a smooth transition is implemented between the first audio signal and the second audio signal within the preset range.

S146-4. The electronic device 200 may splice, based on frequency distribution, the portion of the first audio signal in the first frequency interval 001 and the portion of the second audio signal in the second frequency interval 002 after the smoothing processing so as to obtain the target audio signal.

The preset range herein may be a frequency interval of a preset width including the target frequency. The smoothing processing may be gain processing performed on the audio signal(s) in the preset range with a gain coefficient.

Figure 9:
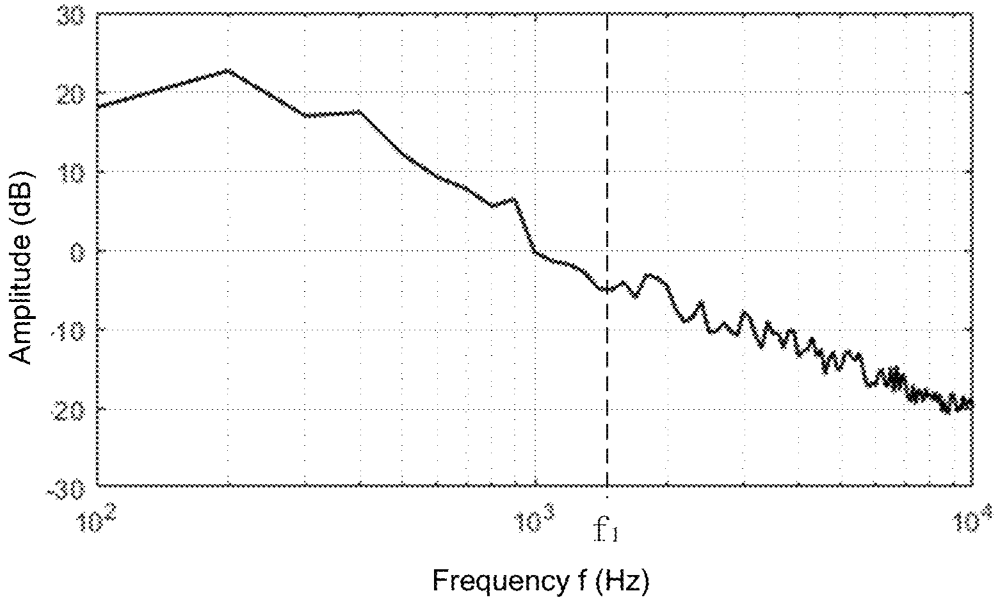
FIG. 9 is a schematic diagram of a target audio signal according to some exemplary embodiments of this disclosure.
Figure 10:
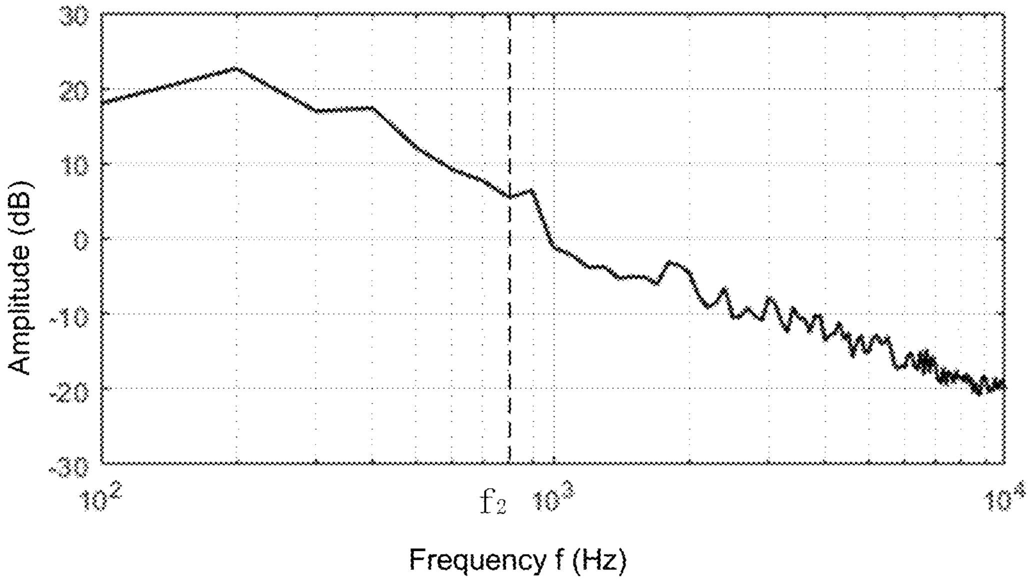
FIG. 10 is a schematic diagram of a target audio signal according to some exemplary embodiments of this disclosure.

FIG. 9 is a schematic diagram of the target audio signal according to some exemplary embodiments of this disclosure. FIG. 10 is a schematic diagram of the target audio signal according to some exemplary embodiments of this disclosure. FIG. 9 corresponds to FIG. 6, and the target frequency of the target audio signal shown in FIG. 9 is the first target frequency $f_1$. FIG. 10 corresponds to FIG. 8, and the target frequency of the target audio signal shown in FIG. 10 is the second target frequency $f_2$.

In summary, the method P100 and system 100 may compare the voice quality of the first audio signal and that of the second audio signal in the frequency domain based on the evaluation indicators of the first audio signal and the second audio signal; define the frequency interval where the voice quality of the first audio signal is higher than the voice quality of the second audio signal as the first frequency interval 001, and define the frequency interval where the voice quality of the first audio signal is lower than the voice quality of the second audio signal as the second frequency interval 002; and splice the audio signal located in the first frequency interval 001 in the first audio signal and the audio signal located in the second frequency interval 002 in the second audio signal, so as to obtain the target audio signal, thereby improving an audio generation effect, and improving the voice quality of the target audio signal. The method P100 and system 100 may dynamically select the target frequency based on the voice quality of the first audio signal and that of the second audio signal, and dynamically divide the frequency domain into the first frequency interval 001 and the second frequency interval 002 based on the target frequency, so as to ensure that the method P100 and system 100 are applicable to any scenario. To be specific, in any scenario, the method P100 and system 100 may achieve best voice quality of the target audio signal in any frequency interval.

Another aspect of this disclosure provides a non-transitory storage medium. The non-transitory storage medium stores at least one set of executable instructions for audio generation, and when the executable instructions are executed by a processor, the executable instructions instruct the processor to implement steps of the audio generation method P100 described in this disclosure. In some exemplary embodiments, each aspect of this disclosure may be further implemented in a form of a program product, where the program product may include program code. When the program product operates on the electronic device 200, the program code may be used to enable the electronic device 200 to perform steps of the audio generation method described in this disclosure. The program product for implementing the aforementioned method may use a portable compact disc read-only memory (CD-ROM) including program code, and may operate on the electronic device 200. However, the program product in this disclosure is not limited thereto. In this disclosure, a readable storage medium may be any tangible medium containing or storing a program, and the program may be used by or in connection with an instruction execution system (for example, the processor 220). The program product may use any combination of one or more readable media. The readable medium may be a readable signal medium or a readable storage medium. For example, the readable storage medium may be, but is not limited to, an electronic, magnetic, optical, electromagnetic, infrared, or semi-conductor system, apparatus, or device, or any combination thereof. More specific examples of the readable storage medium may include: an electrical connection having one or more conducting wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. The readable storage medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. Alternatively, the readable storage medium may be any readable medium other than the readable storage medium. The readable medium may send, propagate, or transmit a program used by or in connection with an instruction execution system, apparatus, or device. The program code contained in the readable storage medium may be transmitted through any appropriate medium, including, but not limited to, wireless or wired medium, an optical cable, RF, or the like, or any appropriate combination thereof. Any combination of one or more programming languages may be used to compile program code for performing operations in this disclosure. The programming languages include object-oriented programming languages such as Java and C++, and may further include conventional procedural programming languages such as the "C" language or a similar programming language. The program code may be fully executed on the electronic device 200, partially executed on the electronic device 200, executed as an independent software package, partially executed on the electronic device 200 and partially executed on a remote computing device, or fully executed on a remote computing device.

Specific exemplary embodiments in this disclosure are described above. Other embodiments also fall within the scope of the appended claims. In some cases, actions or steps described in the claims may be performed in a sequence different from those of these exemplary embodiments, and the expected results may still be achieved. In addition, illustration of specific sequences or continuous sequences is not necessarily required for the processes described in the drawings to achieve the expected results. In some exemplary embodiments, multi-task processing and parallel processing are also allowed or may be advantageous.

In summary, after reading details of the present disclosure, a person skilled in the art would understand that the details in the present disclosure are exemplary, not restrictive. A person skilled in the art would understand that this disclosure covers various reasonable changes, improvements, and modifications to the embodiments, although this is not specified herein. These changes, improvements, and modifications are intended to be proposed in this disclosure and are within the scope of this disclosure.

In addition, some terms in this disclosure are used to describe some exemplary embodiments of this disclosure. For example, "one embodiment", "an embodiment", and/or "some embodiments" mean/means that a specific feature, structure, or characteristic described with reference to the embodiment(s) may be included in at least one embodiment of this disclosure. Therefore, it may be emphasized and should be understood that two or more references to "an embodiment" or "one embodiment" or "alternative embodiment" in various parts of this disclosure do not necessarily all refer to the same embodiment. In addition, specific features, structures, or characteristics may be appropriately combined in one or more embodiments of this disclosure.

It should be understood that in the foregoing description of the embodiments of this disclosure, to help understand one feature, for the purpose of simplifying the disclosure, various features in this disclosure may be combined in a single embodiment, single drawing, or description thereof. However, this does not mean that the combination of these features is necessary. It is possible for a person skilled in the art to extract some of the features as a separate embodiment for understanding when reading this disclosure. In other words, an embodiment in this disclosure may also be understood as an integration of a plurality of sub-embodiments. It is also true when content of each sub-embodiment is less than all features of a single embodiment disclosed above.

Each patent, patent application, patent application publication, and other materials cited herein, such as articles, books, instructions, publications, documents, and other materials may be incorporated herein by reference. All contents used for all purposes, except any prosecution document history related to the content, any identical prosecution document history that may be inconsistent or conflict with this document, or any identical prosecution document history that may have restrictive impact on the broadest scope of the claims, is associated with this document now or later. For example, if there is any inconsistency or conflict between descriptions, definitions, and/or use of terms associated with any material contained therein and descriptions, definitions, and/or use of terms related to this document, the terms in this document shall prevail.

Finally, it should be understood that the implementation solutions of this disclosure disclosed herein are descriptions of principles of the implementation solutions of this disclosure. Other modified embodiments also fall within the scope of this disclosure. Therefore, the embodiments disclosed in this disclosure are merely exemplary and not restrictive. A person skilled in the art may use alternative configurations according to the embodiments of this disclosure to implement the application in this disclosure. Therefore, the embodiments of this disclosure are not limited to those precisely described in this disclosure.

What is claimed is:

1. An audio generation system, comprising:
- at least one storage medium storing a set of instructions for audio generation; and
- at least one processor in communication with the at least one storage medium, wherein during operation, the at least one processor executes the set of instructions to:
- obtain a first audio signal and a second audio signal; and
- generate a target audio signal based on the first audio signal and the second audio signal, wherein
  - a frequency domain of the target audio signal includes a first frequency interval in which a first evaluation indicator of the first audio signal is higher than the first evaluation indicator of the second audio signal, and a second frequency interval in which a second evaluation indicator of the first audio signal is lower than the second evaluation indicator of the second audio signal,
  - in the first frequency interval, the target audio signal is generated based on the first audio signal corresponding to the first frequency interval,
  - in the second frequency interval, the target audio signal is generated based on the second audio signal in the second frequency interval, and
  - ranges of the first frequency interval and the second frequency interval are dynamically adjusted based on at least a dynamic change of the first evaluation indicator of the first audio signal and a dynamic change of the second evaluation indicator of the second audio signal in the frequency domain.

2. The audio generation system according to claim 1, wherein
- the first evaluation indicator is in a positive correlation with a voice quality of the first audio signal;
- the second evaluation indicator is in a positive correlation with a voice quality of the second audio signal;
- the voice quality of the first audio signal is higher than the voice quality of the second audio signal in the first frequency interval; and the voice quality of the first audio signal is lower than the voice quality of the second audio signal in the second frequency interval.

3. The audio generation system according to claim 1, wherein at each frequency in the first frequency interval, the first evaluation indicator has a higher value than the second evaluation indicator, wherein the first evaluation indicator includes a first signal-to-noise ratio corresponding to the first audio signal; and the second evaluation indicator includes a second signal-to-noise ratio corresponding to the second audio signal.

4. The audio generation system according to claim 3, wherein to generate the target audio signal based on the first audio signal and the second audio signal, the at least one processor executes the set of instructions to:

compare the first evaluation indicator and the second evaluation indicator in the frequency domain to obtain a comparison result;

determine at least one target frequency at least based on the comparison result, thereby determining the first frequency interval and the second frequency interval, wherein each target frequency of the at least one target frequency is a frequency point connecting the first frequency interval and the second frequency interval; and generate the target audio signal based on the first frequency interval, the second frequency interval, the first audio signal, and the second audio signal.

5. The audio generation system according to claim 4, wherein the first frequency interval includes at least one continuous frequency interval; and the second frequency interval includes at least one continuous frequency interval.

6. The audio generation system according to claim 4, wherein to determine the first frequency interval and the second frequency interval, the at least one processor executes the set of instructions to:

determine the at least one target frequency based on at least one frequency where the first signal-to-noise ratio is equal to the second signal-to-noise ratio; and determine, with the at least one target frequency as a critical point and within the frequency domain, a frequency interval where the first signal-to-noise ratio is higher than the second signal-to-noise ratio as the first frequency interval, and a frequency interval where the first signal-to-noise ratio is lower than the second signal-to-noise ratio as the second frequency interval.

7. The audio generation system according to claim 6, wherein each target frequency of the at least one target frequency is in a frequency interval of a preset width in a vicinity of the frequency where the first signal-to-noise ratio is equal to the second signal-to-noise ratio.

8. The audio generation system according to claim 4, wherein to determine the first frequency interval and the second frequency interval, the at least one processor executes the set of instructions to:

obtain a signal-to-noise ratio threshold;

determine a frequency where the first signal-to-noise ratio is equal to the second signal-to-noise ratio as at least one first target frequency;

determine a frequency where the first signal-to-noise ratio is equal to the signal-to-noise ratio threshold as at least one second target frequency;

compare, at each frequency of the at least one first target frequency and the at least one second target frequency, the first signal-to-noise ratio with the second signal-to-noise ratio, and comparing the first signal-to-noise ratio with the signal-to-noise ratio threshold;

determine a frequency where the first signal-to-noise ratio is not less than the second signal-to-noise ratio and the signal-to-noise ratio threshold as the at least one target frequency; and determine, with the at least one target frequency as a critical point, a frequency interval where the first signal-to-noise ratio is higher than the second signal-to-noise ratio as the first frequency interval, and a frequency interval other than the first frequency interval within the frequency domain as the second frequency interval.

9. The audio generation system according to claim 4, wherein to generate the target audio signal based on the first frequency interval, the second frequency interval, the first audio signal, and the second audio signal, the at least one processor executes the set of instructions to:

within a preset frequency range around each of the at least one target frequency, perform smoothing processing over the first audio signal and the second audio signal to obtain a smooth transition between the first audio signal and the second audio signal within the present frequency range; and splice, based on frequency distribution, a portion of the first audio signal in the first frequency interval and a portion of the second audio signal in the second frequency interval after the smoothing processing to obtain the target audio signal.

10. The audio generation system according to claim 1, wherein the first audio signal is an audio signal output by at least one first-type microphone; and the second audio signal is an audio signal output by at least one second-type microphone.

11. The audio generation system according to claim 10, wherein the at least one first-type microphone is configured to capture a human body vibration signal and includes a bone-conduction microphone; and the at least one second-type microphone is configured to capture an air vibration signal and includes an air-conduction microphone.

12. The audio generation system according to claim 10, wherein the first audio signal includes an audio signal directly output by the at least one first-type microphone; and the second audio signal includes an audio signal directly output by the at least one second-type microphone.

13. The audio generation system according to claim 10, wherein the first audio signal includes an audio signal obtained after denoising the audio signal directly output by the at least one first-type microphone; and the second audio signal includes an audio signal obtained after denoising the audio signal directly output by the at least one second-type microphone.

14. An audio generation method, comprising:

obtaining a first audio signal and a second audio signal; and generating a target audio signal based on the first audio signal and the second audio signal, wherein a frequency domain of the target audio signal includes a first frequency interval in which a first evaluation indicator of the first audio signal is higher than a second evaluation indicator of the second audio signal, and a second frequency interval in which the first evaluation indicator of the first audio signal is lower than the second evaluation indicator of the second audio signal, the first frequency interval includes at least one continuous frequency interval, and the second frequency interval includes at least one continuous frequency interval, in the first frequency interval, the target audio signal is generated based on the first audio signal corresponding to the first frequency interval, in the second frequency interval, the target audio signal is generated based on the second audio signal corresponding to the second frequency interval, and ranges of the first frequency interval and the second frequency interval are dynamically adjusted based on at least a dynamic change of the first evaluation indicator of the first audio signal and a dynamic change of the second evaluation indicator of the second audio signal in the frequency domain.

15. The audio generation method according to claim 14, wherein the first evaluation indicator includes a first signal-to-noise ratio corresponding to the first audio signal;

the second evaluation indicator includes a second signal-to-noise ratio corresponding to the second audio signal;

the first evaluation indicator has a higher value than the second evaluation indicator in the first frequency interval; and the first evaluation indicator has a lower value than the second evaluation indicator in the second frequency interval.

16. The audio generation method according to claim 15, wherein the generating of the target audio signal based on the first audio signal and the second audio signal includes:

comparing the first evaluation indicator and the second evaluation indicator in the frequency domain to obtain a comparison result;

determining at least one target frequency at least based on the comparison result, thereby determining the first frequency interval and the second frequency interval, wherein each target frequency of the at least one target frequency is a frequency point connecting the first frequency interval and the second frequency interval; and generating the target audio signal based on the first frequency interval, the second frequency interval, the first audio signal, and the second audio signal.

17. The audio generation method according to claim 16, wherein the determining of the first frequency interval and the second frequency interval includes:

determining at least one frequency where the first signal-to-noise ratio is equal to the second signal-to-noise ratio as the at least one target frequency; and determining, with the at least one target frequency as a critical point and within the frequency domain, a frequency interval where the first signal-to-noise ratio is higher than the second signal-to-noise ratio as the first frequency interval, and a frequency interval where the first signal-to-noise ratio is lower than the second signal-to-noise ratio as the second frequency interval.

18. The audio generation method according to claim 16, wherein the determining of the first frequency interval and the second frequency interval includes:

obtaining a signal-to-noise ratio threshold;

determining a frequency where the first signal-to-noise ratio is equal to the second signal-to-noise ratio as at least one first target frequency;

determining a frequency where the first signal-to-noise ratio is equal to the signal-to-noise ratio threshold as at least one second target frequency;

comparing, at each frequency of the at least one first target frequency and the at least one second target frequency, the first signal-to-noise ratio with the second signal-to-noise ratio, and comparing the first signal-to-noise ratio with the signal-to-noise ratio threshold;

determining a frequency where the first signal-to-noise ratio is not less than the second signal-to-noise ratio and the signal-to-noise ratio threshold as the at least one target frequency; and determining, with the at least one target frequency as a critical point, a frequency interval where the first signal-to-noise ratio is higher than the second signal-to-noise ratio as the first frequency interval, and a frequency interval other than the first frequency interval within the frequency domain as the second frequency interval.

19. The audio generation method according to claim 16, wherein the generating of the target audio signal based on the first frequency interval, the second frequency interval, the first audio signal, and the second audio signal includes:

within a preset frequency range around each of the at least one target frequency, performing smoothing processing over the first audio signal and the second audio signal to obtain a smooth transition between the first audio signal and the second audio signal within the present frequency range; and splicing, based on frequency distribution, a portion of the first audio signal in the first frequency interval and a portion of the second audio signal in the second frequency interval after the smoothing processing to obtain the target audio signal.

20. The audio generation method according to claim 14, wherein the first audio signal is an audio signal output by at least one first-type microphone; and the second audio signal is an audio signal output by at least one second-type microphone, wherein the at least one first-type microphone is configured to capture a human body vibration signal and includes a bone-conduction microphone; and the at least one second-type microphone is configured to capture an air vibration signal and includes an air-conduction microphone.

* * * * *